Oct. 12, 1926.

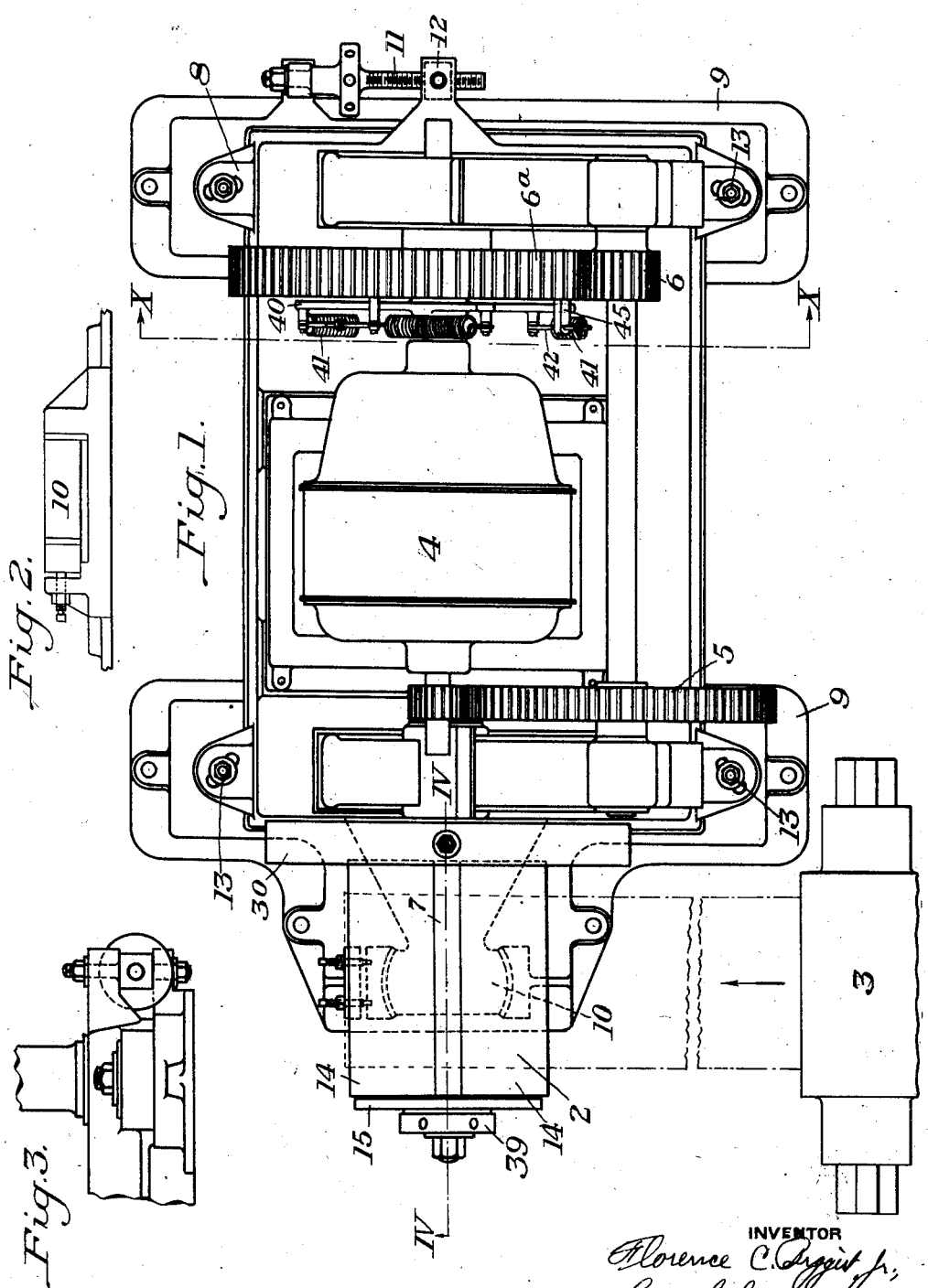

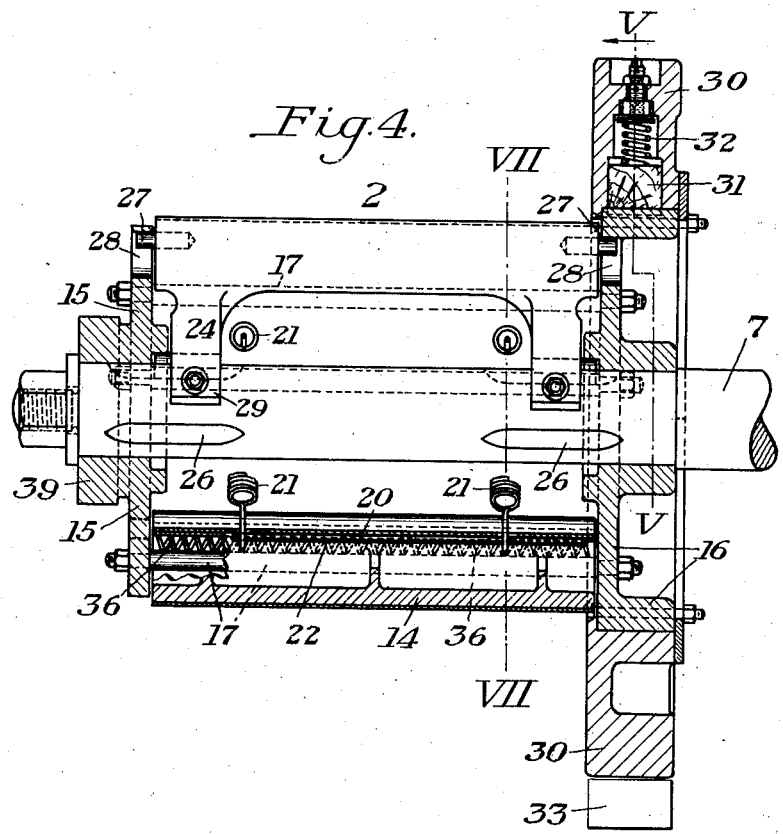
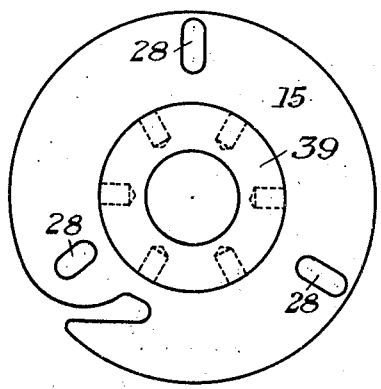
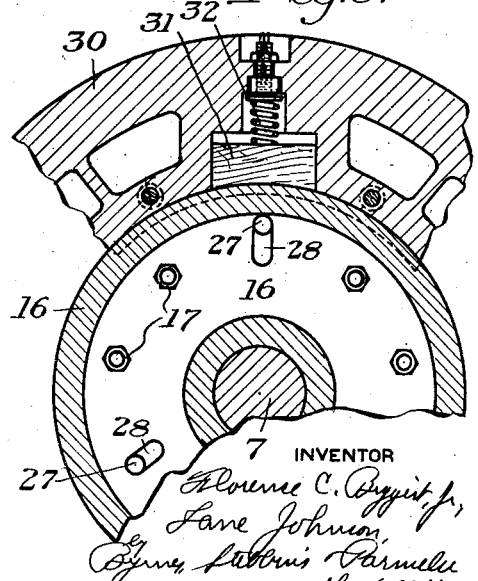

F. C. BIGGERT, JR., ET AL

REEL

Filed March 1. 1923

Patented Oct. 12, 1926.

1,603,017

UNITED STATES PATENT OFFICE.

FLORENCE C. BIGGERT, JR., OF CRAFTON, AND LANE JOHNSON, OF PITTSBURGH, PENNSYLVANIA, ASSIGNORS TO UNITED ENGINEERING AND FOUNDRY COMPANY, OF PITTSBURGH, PENNSYLVANIA, A CORPORATION OF PENNSYLVANIA.

REEL.

Application filed March 1, 1923. Serial No. 622,120.

This invention relates broadly to reels, and is particularly adapted for use in coiling thin material such as rolled strips as they come from the mill.

Our invention relates especially to a reel having a collapsible winding drum of novel construction, and to novel means for accurately alining the reel with the source of supply of the material being wound.

In the accompanying drawings illustrating the present preferred embodiment of our invention:—

Figure 1 is a top plan view of a reel embodying our invention,

Figure 2 is an end elevation of a portion of Figure 1,

Figure 3 is a side elevation of a portion of Figure 1,

Figure 4 is a vertical section on the line IV—IV of Figure 1,

Figure 5 is a vertical section on the line V—V of Figure 4,

Figure 6 is a view of an end frame of the winding drum,

Figure 7:
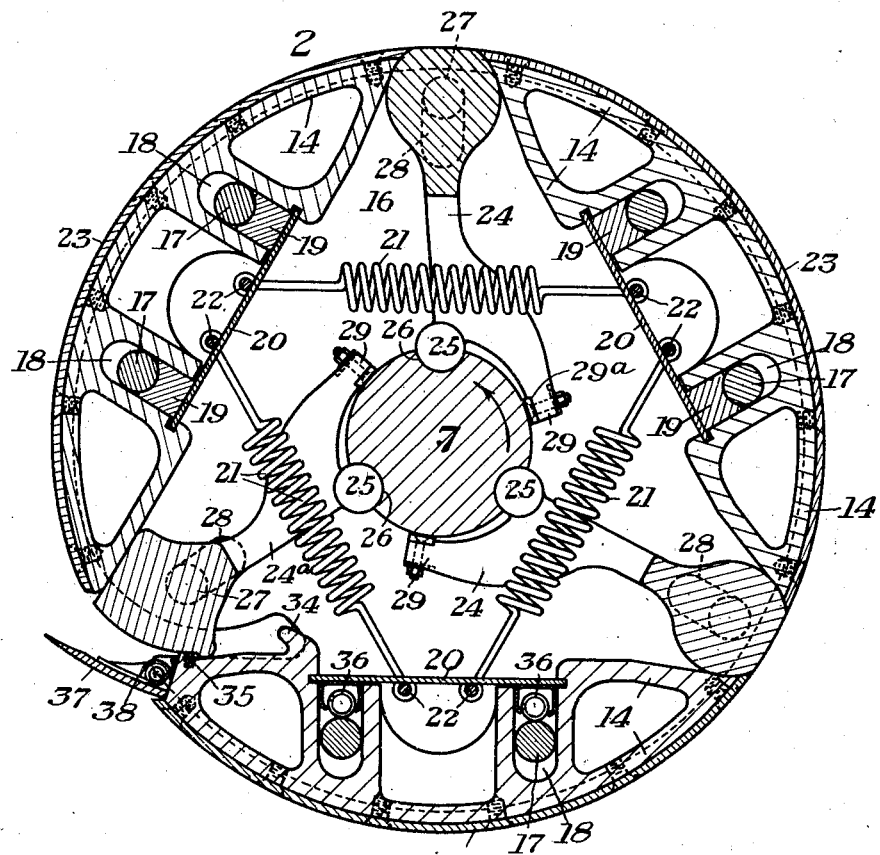
Figure 8:
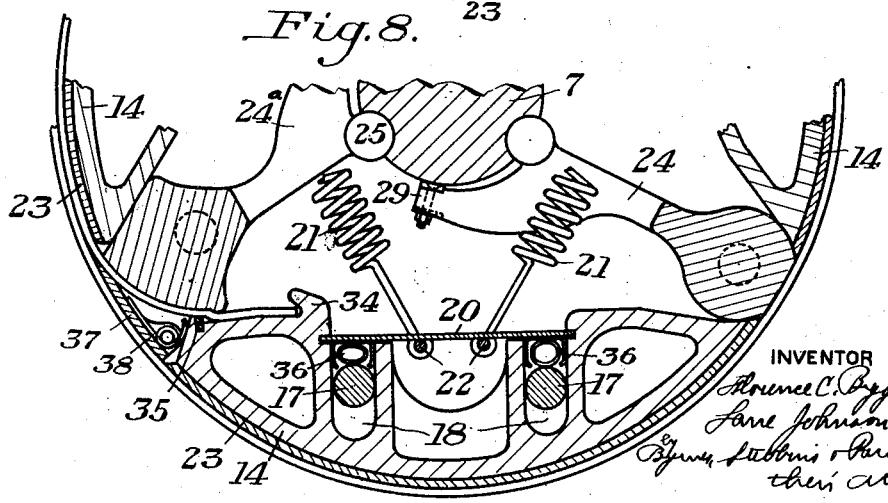
Figure 9:
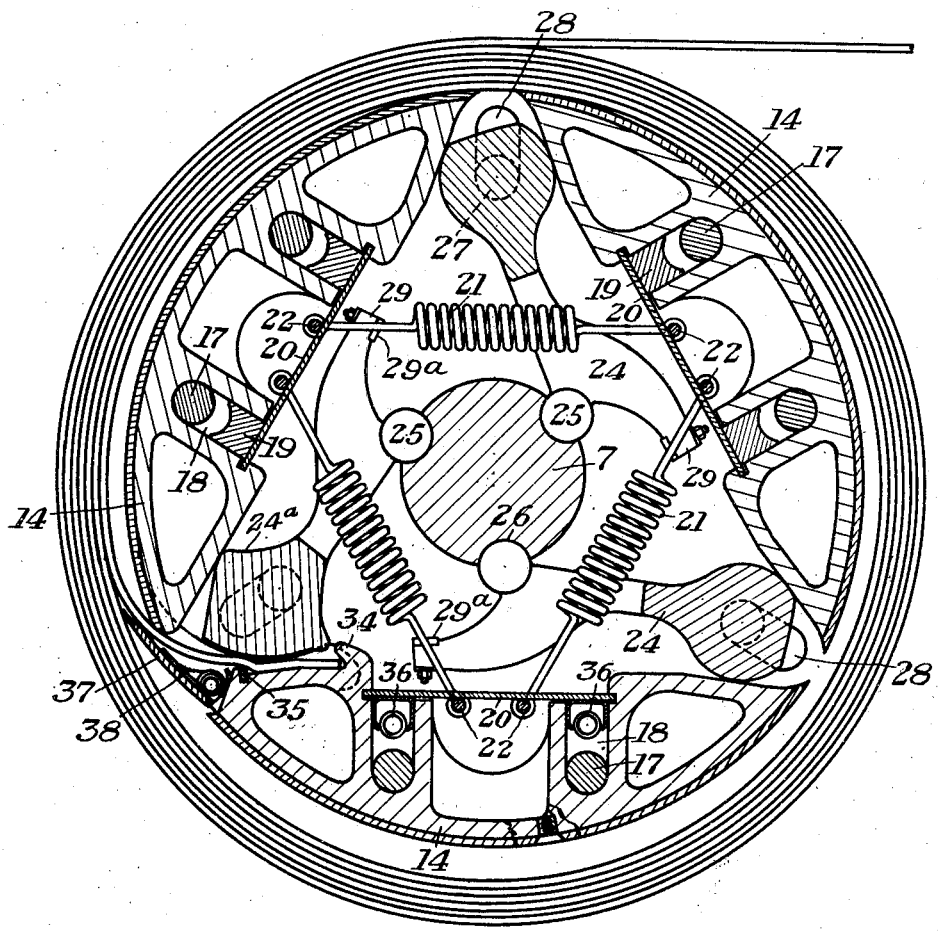
Figure 10:
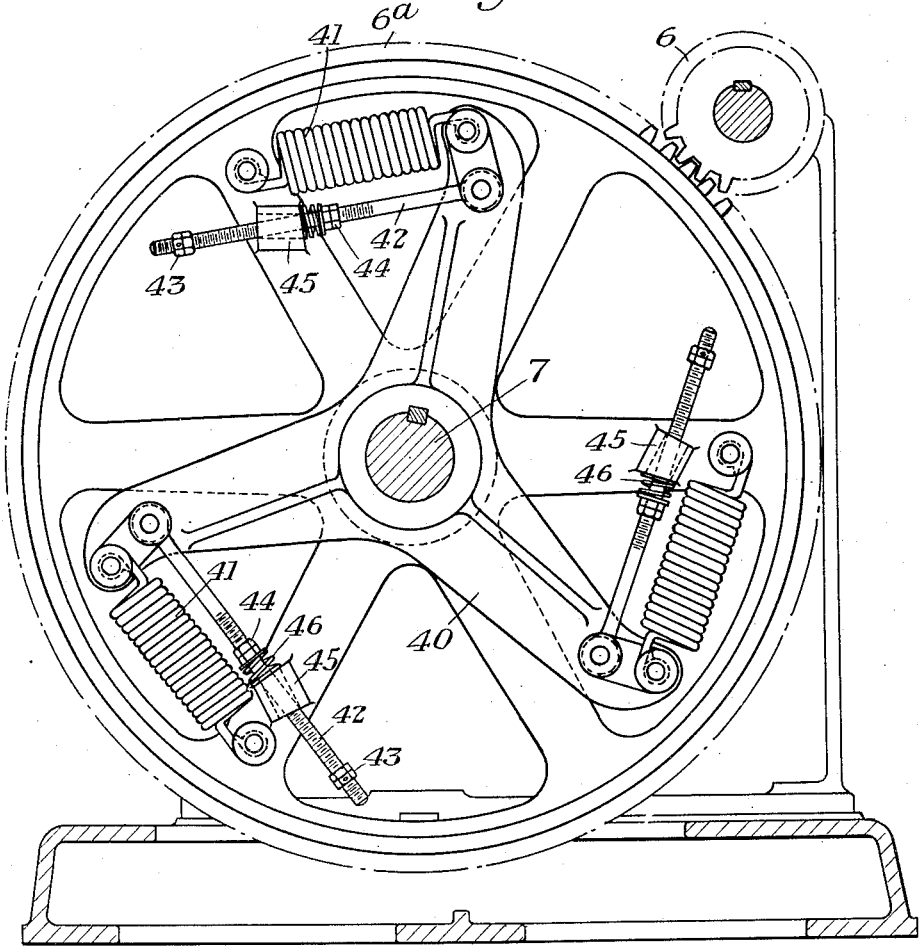
Figure 11:
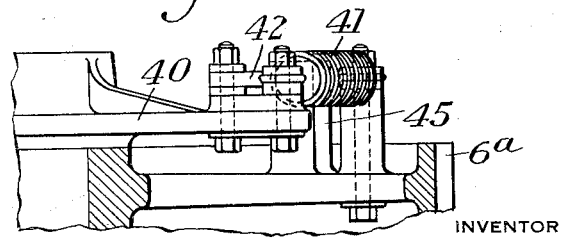

Figure 7 is a sectional view on the line VII—VII of Figure 4, showing the collapsible winding drum in expanded position, Figure 8 is a fragmentary view similar to Figure 7, showing one coil of the wound material in place, Figure 9 is a view similar to Figure 7 but showing the drum collapsed, Figure 10 is a vertical section on the line X—X of Figure 1, and Figure 11 is a bottom view of a portion of Figure 10.

In the illustrated embodiment of our invention, the material to be wound reaches the winding drum 2 of the reel from any desired supply means. Such a means may be a pair of pinch rolls 3 as schematically illustrated in Figure 1. The winding drum is driven by a motor 4 through gear trains 5 and 6, the last gear of which is carried by a drive shaft 7. The motor 4 is preferably provided with a dynamic brake. The motor and gear reduction are supported by a frame 8 mounted on a base 9. The frame 8 is rotatably secured to the base 9 through a pivot 10, the axis of which preferably passes through the center of the winding drum. The position of the frame 8 relative to the base 9 is adjusted by means of a screw 11 carried by the base 9 engaging a nut 12 on the frame 8. By turning the screw 11, the frame 8 may be moved around the pivot 10 to adjust the axis of the winding drum 2 with respect to the pinch rolls 3 and the material delivered therefrom. When a satisfactory adjustment has been secured, the frame 8 is clamped in position by base bolts 13. The screw 11 and nut 12 constitute an irreversible adjusting means, thereby making it possible to adjust while the machine is under load, and with the base bolts 13 loose, without any possibility of the adjustment being affected by the load.

The winding drum 2 comprises a plurality of drum segments 14, carried between end frames 15 and 16 of the drum, on spacer rods 17. The spacer rods 17 are rigidly connected to the end frames 15 and 16, both of which are free to revolve on the shaft 7. The segments 14 are provided with slots 18, in which the spacer rods 17 are located. This construction permits movement of the segments 14 radially. The radial movement of the segments 14 outwardly is limited by stops 19 set into the slots 18 and held therein by cover plates 20. Springs 21 tend to normally draw the segments 14 together. The ends of these springs are passed through holes in the cover plates 20 and are secured by pins 22. The segments 14 may have a facing 23 of soft material, such as brass, to prevent marring of the wound material.

The winding drum is expanded and driven by a counter-clockwise rotation of the shaft 7, as shown by the arrow in Figure 7. Arms 24 and 24ª are pivotally connected to the shaft 7 by cylindrical portions 25 which lie in grooves 26 cut in the shaft 7. The arms are provided at their outer ends with studs 27 engaging with approximately radial slots 28 in the end frames 15 and 16. The outer ends of the arms 24 and 24ª are swelled to engage the drum segments 14, while the inner ends are provided with fingers 29 adapted to lie against the shaft 7 when the drum is expanded. These fingers are provided with replaceable working facings 29ª to allow for wear.

The end frame 16 carries a fly-wheel 30 adapted to receive a plurality of brake blocks 31 which are pressed against the periphery of the end frame 16 by compression springs 32. When the shaft 7 is rotated counter-clockwise, the inertia of the fly-wheel 30, acting through the brake blocks 31, tends to hold the end frame stationary. If desired, a brake 33 of any desired form may be pressed against the rim of the fly-wheel to assist the inertia effect. As the shaft 7 rotates, the studs 27 are moved outwardly in the slots 28, and the swelled portions of the arms 24 and 24$^a$ move outwardly between the drum segments 14 and expand the drum.

As shown in Figure 7, the arms 24 and 24$^a$ serve to fill in the spaces between the segments 14 to form an unbroken winding surface when the drum is fully expanded.

The expansion of the drum is limited by the fingers 29 which come into contact with the shaft 7 and prevent further relative movement between the arms and the shaft. From this point on, the entire drum is driven at the same speed as the shaft, and the end frame 16 slips under the brake blocks 31, until the fly-wheel 30 is brought up to speed, after which everything is driven at the same speed.

One of the openings between the drum segments 14 is adapted to receive and clamp the end of the strip to be wound, as clearly shown in Figure 8. The drum segment is provided on its inner face with a stop 34 and a gripping edge 35, which is preferably of tool steel. The arm 24$^a$ is adapted to engage the strip at a point on the drum segment between the stop 34 and the gripping edge 35, thereby ensuring a tight grip on the material. The arm 24$^a$ may, of course, be provided with a steel gripper if desired. The slots 18 on the drum segment are provided with yielding stops to allow for the thickness of the material. These stops are preferably coil springs 36 laid between the spacer bars 17 and the plate 20 and parallel to the axis of the drum. These springs provide for varying thicknesses of material, and at the same time ensure a tight and secure grip.

A bridge 37 is attached to the drum segment 14 to complete the winding surface above the gripping device. The bridge 37 is normally held out from the drum by a spring 38, as clearly shown in Figure 7, to facilitate entering the strip in the gripping device.

When the reel is operated, the end of the strip to be wound is placed in the gripping device with the drum collapsed. The motor 4 is then started, the shaft 7 rotates counter-clockwise and the drum 2 is thereby expanded as explained above. The expansion of the drum secures the material in the gripping device and the drum begins to rotate as soon as the fingers 29 come into contact with the shaft 7. As soon as one revolution of the drum has been made, the bridge 37 is pressed down by the material and the winding continues to completion.

When the winding is completed, the drum is collapsed to facilitate the removal of the coil. This is automatically accomplished when the current to the motor 4 is cut off, at which time the dynamic brake quickly reduces the speed of the shaft 7. The inertia of the fly-wheel 30 and of the drum and the wound material, rotates the drum ahead of the shaft 7. This movement serves to rotate the arms 24 and 24$^a$ around their pivots 25, whereupon the springs 21 draw the drum segments 14 together and collapse the drum. This action also serves to release the gripping device and the coil may then be slipped off the end of the drum. A capstan-head 39 on the end frame 15 provides a ready means for expanding or collapsing the drum by hand, as may be desired.

To eliminate shocks in starting and stopping, the gear reduction 6 drives the shaft 7 through a yielding connection, as shown in Figure 10. The gear 6$^a$ is loose on the shaft 7 and lies next to a spider 40 which is keyed to the shaft. Springs 41 connect the gear to the spider and serve to absorb any shocks in starting. The relative movement between the gear and the spider is limited by rods 42 carrying adjustable check-nuts 43 and 44. In the drawing the rods 42 are shown attached to the spider 40 and passing through bosses 45 on the arms of the gear 6$^a$. Coil springs 46 are placed over the rods to avoid shocks when the machine comes to rest.

It will be noted that after the drum has been collapsed in bringing the reel to rest, the fly-wheel 30 may still possess considerable inertia which tends to rotate it ahead of the end frame 16. This inertia is rapidly used up by the brake blocks 31 pressing on the periphery of the end frame 16, and the fly-wheel is brought to rest without any such strains as would be set up if the fly-wheel were rigidly connected to the winding drum.

Our invention provides a winding drum of improved construction, which may be readily collapsed and expanded as desired. It also provides novel means for shifting the axis of the winding drum with respect to the material feeding means.

While we have shown one embodiment of our invention, it will be understood that it is not limited thereto, but may be embodied in other constructions within the scope of the following claims.

We claim:—

1. A reel, comprising winding drum segments, means for rotating said segments adapted for limited rotational movement about the rotational axis of the reel relative thereto, and means effective upon such relative movement for spreading said segments, said means being adapted to lie between the segments and form a substantially continuous winding surface when the segments are spread.

2. A reel including winding drum segments, a plurality of means for spreading the same, and springs tending to resist the spreading action, one of said means being adapted to grip the material being wound and one of said drum segments being provided with auxiliary means for resisting the spreading action.

3. A reel including winding drum segments, means for spreading the same, and means for limiting the spreading action, one of said drum segments being provided with yielding limiting means.

4. A reel including a drive shaft, a collapsible winding drum, means for collapsing or expanding the winding drum upon relative rotational movement between the drive shaft and the winding drum, and a fly-wheel for automatically producing said relative movement upon stopping or starting of the reel, the fly-wheel being adapted to produce said relative movement through frictional engagement with a portion of the drum.

5. A reel, comprising winding drum segments, means for rotating said segments adapted for limited rotational movement about the rotational axis of the reel relative thereto, means effective upon such relative movement for spreading said segments, said means being adapted to lie between the segments and form a substantially continuous winding surface when the segments are spread, and means for insuring such relative movement when the reel is started.

6. A reel, comprising winding drum segments, a drum shaft for rotating said segments and adapted for limited rotation relative thereto about the axis of the reel when the reel is started, and means effective upon such relative rotation for spreading the drum segments, said means lying between the drum segments and forming therewith a substantially continuous winding surface when the segments are spread.

7. A reel, comprising winding drum segments movable toward and from the axis of the drum, means for rotating said segments adapted for limited rotational movement relative thereto about the axis of the reel when the reel is started, and means having sliding engagement with said segments for automatically moving them outwardly to expand the drum, said means being effective upon such relative movement between the segments and rotating means.

8. A reel, comprising winding drum segments movable toward and from the axis of the drum, means for rotating said segments adapted for limited rotational movement relative thereto about the axis of the reel when the reel is started, and means having sliding engagement with said segments for automatically moving them outwardly to expand the drum, said means being effective upon such relative movement, said means lying between said segments and forming therewith a continuous winding surface when the drum is expanded.

9. A reel, comprising winding drum segments movable toward and from the axis of the drum, means for rotating said segments adapted for limited rotational movement relative thereto about the axis of the reel when the reel is started, means having sliding engagement with said segments for automatically moving them outwardly to expand the drum, said means being effective upon such relative movement, and yielding means acting on said segments and tending to normally maintain the drum collapsed.

10. A reel, comprising winding drum segments movable toward and from the axis of the drum, means for rotating said segments adapted for limited rotational movement relative thereto about the axis of the reel when the reel is started, means having sliding engagement with said segments for automatically moving them outwardly to expand the drum, said means being effective upon such relative movement, said means lying between said segments and forming therewith a substantially continuous winding surface when the drum is expanded, and yielding means acting on said segments and tending to normally maintain the drum collapsed.

11. A reel, comprising winding drum segments bodily movable radially toward and from the axis of the drum, means for rotating said segments adapted for limited rotational movement relative thereto about the axis of the reel when the reel is started, and means having sliding engagement with said segments for automatically moving them outwardly to expand the drum, said means being effective upon such relative movement.

12. A reel, comprising winding drum segments bodily movable radially toward and from the axis of the drum, means for rotating said segments adapted for limited rotational movement relative thereto about the axis of the reel when the reel is started, means having sliding engagement with said segments for automatically moving them outwardly to expand the drum, said means being effective upon such relative movement, and spring means interconnecting the segments and tending to normally maintain the drum collapsed.

13. A reel, comprising drum segments movable toward and from the axis of the drum, means for rotating said segments adapted for limited rotational movement relative thereto about the axis of the reel when the reel is started, and arms positioned between the segments and each cooperating with a pair thereof for automatically moving said segments outwardly to expand the drum, said arms being effective upon such relative movement.

14. A reel, comprising drum segments bodily movable radially toward and from the axis of the drum, means for rotating said segments adapted for limited movement relative thereto when the reel is started, and arms arranged between said segments and each having a radially movable portion in sliding engagement with a pair thereof for automatically moving said segments outwardly to expand the drum, said arms being effective upon such relative movement.

15. A reel, comprising drum segments bodily movable radially toward and from the axis of the drum, means for rotating said segments adapted for limited movement relative thereto when the reel is started, arms arranged between said segments and each having a radially movable portion in sliding engagement with a pair thereof for automatically moving said segments outwardly to expand the drum, said arms being effective upon such relative movement, and spring means acting on said segments and tending to normally maintain said drum collapsed.

16. A reel, comprising a shaft, winding drum segments around said shaft and movable toward and from the same, said shaft being adapted for limited movement relative to said segments when the reel is started, and arms pivoted to said shaft and each having its outer end portion positioned between and in sliding engagement with a pair of segments, said end portions being movable radially outwardly for automatically expanding the drum when such relative movement takes place.

17. A reel, comprising a shaft, winding drum segments around said shaft and movable toward and from the same, said shaft being adapted for limited rotation relative to said segments when the reel is started, and arms pivoted to said shaft and each having its outer end portion positioned between and in sliding engagement with a pair of segments, said end portions being movable radially outwardly for automatically expanding the drum when such relative movement takes place and forming with said segments a continuous winding surface when the drum is expanded.

18. A reel, comprising a shaft, end frames journaled on said shaft, spacer rods rigidly connected to the end frames, winding drum segments bodily movable toward and from said shaft, said shaft being adapted for limited rotation relative to said segments when the reel is started, said segments having radial slots through which said rods extend and whereby the movements of said segments are guided, and means for automatically spreading the drum segments effective upon such relative rotation.

19. A reel, comprising a shaft, end frames journaled on said shaft, means rigidly connecting said end frames, drum segments supported on said connecting means, means coacting with said segments for automatically expanding the drum during initial rotation of said shaft, a fly-wheel rotatably mounted on one of said end frames, and friction means interposed between said fly-wheel and end frame tending to prevent relative rotation between said fly-wheel and end frame.

20. A reel, comprising a shaft, winding drum segments around said shaft and movable toward and from the same, and arms pivoted to said shaft and each having its outer end portion positioned between and in sliding engagement with a pair of segments, said end portions being movable radially outwardly for automatically expanding the drum during rotation of the latter, and one of said arms and the cooperating portion of one of said segments being adapted to clamp the end of a strip to be wound upon such outward movement of said arm.

21. A reel, comprising a shaft, winding drum segments around said shaft and movable toward and from the same, and arms pivoted to said shaft and each having its outer end portion positioned between and in sliding engagement with a pair of segments, said end portions being movable radially outwardly for automatically expanding the drum during rotation of the latter, and one of said arms and the cooperating portion of one of said segments being adapted to clamp the end of a strip to be wound upon such outward movement of said arm, said last mentioned segment having a bridge attached thereto arranged to complete the winding surface above said cooperating clamping arm.

22. In a reel, a central shaft, a plurality of segments cooperating therewith, said shaft and segments being constructed to permit a relative rotational movement therebetween about the axis of the shaft, and means operative upon such relative movement in one direction for expanding the segments, said means constituting an operative connection intermediate the shaft and sections.

In testimony whereof we have hereunto set our hands.

FLORENCE C. BIGGERT, Jr.
LANE JOHNSON.